United States Patent
Drummond, II

(10) Patent No.: US 7,237,014 B2
(45) Date of Patent: Jun. 26, 2007

(54) SYSTEM AND METHOD FOR IN SITU, REAL-TIME, SUPPLY CHAIN, INTEROPERABILITY VERIFICATION

(75) Inventor: Richard VaNeile Drummond, II, Fort Worth, TX (US)

(73) Assignee: Drummond Group, Ft. Worth, TX (US)

( * ) Notice: Subject to any disclaimer, the term of this patent is extended or adjusted under 35 U.S.C. 154(b) by 0 days.

(21) Appl. No.: 10/386,609

(22) Filed: Mar. 12, 2003

(65) Prior Publication Data
US 2004/0024868 A1 Feb. 5, 2004

Related U.S. Application Data

(60) Provisional application No. 60/400,428, filed on Aug. 1, 2002.

(51) Int. Cl.
G06G 15/16 (2006.01)
(52) U.S. Cl. ............ 709/217; 203/218; 203/219; 714/25; 714/38; 717/131; 717/135
(58) Field of Classification Search ............ 709/248, 709/219, 224, 217, 203; 707/501; 714/100, 714/38, 43, 738, 739, 25; 717/131, 135
See application file for complete search history.

(56) References Cited

U.S. PATENT DOCUMENTS

| | | | |
|---|---|---|---|
| 5,745,767 A | 4/1998 | Rosen et al. | |
| 5,978,940 A | 11/1999 | Newman et al. | |
| 6,038,517 A | 3/2000 | Dobbins et al. | |
| 6,253,368 B1 | 6/2001 | Nelin et al. | |
| 6,260,065 B1 | 7/2001 | Leiba et al. | |
| 6,401,135 B1 | 6/2002 | Chang | |
| 6,662,217 B1 * | 12/2003 | Godfrey et al. | 709/219 |
| 6,681,383 B1 * | 1/2004 | Pastor et al. | 717/126 |
| 6,697,967 B1 * | 2/2004 | Robertson | 714/43 |
| 6,766,477 B2 * | 7/2004 | Grucci et al. | 714/38 |
| 2002/0138510 A1 * | 9/2002 | Tan | 707/501.1 |
| 2002/0198785 A1 * | 12/2002 | Chae | 705/26 |
| 2003/0033406 A1 | 2/2003 | John et al. | |
| 2003/0126521 A1 * | 7/2003 | Radestock | 714/100 |
| 2003/0149919 A1 * | 8/2003 | Greenwald et al. | 714/43 |
| 2003/0236994 A1 * | 12/2003 | Cedar et al. | 713/200 |
| 2004/0003325 A1 * | 1/2004 | Muller et al. | 714/38 |
| 2004/0044794 A1 * | 3/2004 | Srinivasan | 709/248 |

* cited by examiner

Primary Examiner—Rupal Dharia
Assistant Examiner—Djenane M. Bayard
(74) Attorney, Agent, or Firm—Jackson Walker LLP; Robert C. Klinger

(57) ABSTRACT

The present invention discloses a system and method for performing interoperability testing. The method comprises sending a command from a server module to a client module, receiving the command at an application under test module via a shared directory module between the client module and the application under test module, executing a test at the application under test module based on the received command, and sending results of the test from the application under test module to the server module via the shared directory module and the client module, wherein the test is executed, and the results of the interoperability of the application between the client module and server module are sent, in a real-time, low-intrusive, supply chain setting.

28 Claims, 11 Drawing Sheets

SYSTEM AND METHOD FOR IN SITU, REAL-TIME, SUPPLY CHAIN, INTEROPERABILITY VERIFICATION

CROSS REFERENCE TO RELATED APPLICATIONS

This application is related to and claims priority of U.S. Provisional Patent Application No. 60/400,428, filed on Aug. 1, 2002, entitled IN SITU LIFECYCLE INTEROPERABILITY VALIDATION SYSTEM.

FIELD OF THE INVENTION

The present invention generally relates to interoperability testing and, more particularly, to a system and method for In Situ, real-time, supply chain interoperability verification and testing.

BACKGROUND OF THE INVENTION

Business-to-business (B2B) electronic commerce, until recently, was conducted using proprietary protocols and/or a few products at a particular standard layer (such as, for example, the International Standard Organization (ISO) Open System Interconnect (OSI) session, presentation and application layers). With the advent of new protocols for B2B data transmittal such as objects, Applicability Statement 1 protocol (AS1), Applicability Statement 2 protocol (AS2), Requests for Comments (RFC), and Electronic Business using eXtensible Markup Language (ebXML) messaging, along with business process document routing through computer systems and different applications, registries, repositories, XML based business documents, and application-to-application mapping software, products based on standards are becoming available, which while often conformant to a standards specification, are not know to be interoperable which is a must in B2B electronic commerce.

Certain current automated systems perform conformance testing but do not perform interoperability testing in a manner which supports the needs of the business community. The systems that do perform automated interoperability testing are limited in that they are not built to work In Situ, in the actual environments they are to be used in. Therefore, such automated interoperability validation and testing is not usable in a live supply chain, value chain, or distribution channel environment.

Other systems that are currently available for performing interoperability tests various problems that are not solvable without introducing an automated interoperability test system of the present invention. Such systems perform interoperability testing, for example, in certain phases such as a debug phase, a dry-run phase, and a final phase. The debug phase often conducts hundreds of individual tests against other products. The tests are designed to identify bugs, are very incremental in nature, and generally take a few months to conduct (with a set of software vendors, for example). Such vendors typically record by hand messages received and sent by all other vendors in the group, and problems are typically discussed on daily conference calls.

The dry-run phase typically consists of nearly 10% of the number of actual tests as compared to the debug phase. Preliminary tests are assumed to have successfully identified and corrected bugs, hence incremental analysis of the components needs be performed. These tests generally take around one week to conduct. The final phase, which demonstrates interoperability, predominantly repeats the steps of the dry-run phase. This ensures that a setup issue, which may have been encountered during the dry-run phase, does not preclude a product from passing the interoperability test. The complexity of this phase is similar as that of the dry run phase. This test generally take around one week to conduct.

There are a number of problems and limitations associated with the previous phases. For example, as products enter production, software bug fixes and minor enhancements are typically made. These changes most often render the product un-interoperable, despite the long effort in testing. Further, testing currently takes too long and manpower test costs are too high for a software vendor to continually support. These problems and limitations require automated interoperability test systems, specific to individual supply chains, to ensure those supply chains remain highly available.

Certain associations and organizations have testing labs for some hardware and basic software standards. However, the systems in these labs do not generalize well and often require significant setup and concurrent location of all products at the lab for testing. While these current systems and methods in testing may work well for specific standards or a set of closely related standards, they do not generalize well to a general test process. Further, the current methods do not work for automated In Situ testing within a supply chain, value chain or distribution channel where a large number of loosely coupled trading partners install and use products in uncontrolled settings. Solving this problem will require the ability to conduct ad hoc, periodic interoperability tests and In Situ validation (of the final phase type) on live production supply chain products.

Additionally, while there are a considerable and growing number of system management software vendors with products aimed at performance and availability management operations such as monitoring, event management, event correlation, and root cause analysis, none of these vendors is focused on resolving issues with higher level software such as secure messaging systems or application level automated interoperability assurance testing, validation and monitoring.

It is therefore desirable for the present invention to overcome the problems and limitations described above that are involved in interoperability testing.

SUMMARY OF THE INVENTION

The present invention achieves technical advantages as a system and method for In Situ, real-time, supply chain, distribution channel and value chain interoperability testing.

In one embodiment, a method for performing interoperability testing comprises sending a command from a server module to a client module, receiving the command at an application under test module via a shared directory module between the client module and the application under test module, executing a test at the application under test module based on the received command, and sending results of the test from the application under test module to the server module via the shared directory module and the client module, wherein the test is executed, and the results of the interoperability of the application between the client module and server module are sent, in a real-time, low-intrusive, supply chain setting.

In another embodiment, a method for performing interoperability testing comprises generating a test expectation message by a server, sending the test expectation message to a first client, sending the test expectation message to a second client, wherein the test expectation message indicates at least one test case to be executed by one of the first client or the second client, receiving a ready to receive message by the server from one of the first client or the second client, wherein the ready to receive message indicates to the server which one of a first server, operably coupled to the first client, or a second server, operably coupled to the second client, is ready to receive a message from the other one of the first server or second server, and executing the at least one test case by the one of the first client or the second client, wherein the at least one test case is a real-time, low-intrusive, supply chain interoperability test.

In a further embodiment, a computer readable medium comprises instructions for generating a message by a first module (such as, for example, a server), sending the message to a second module (such as, for example, a first client), sending the message to a third module (such as, for example, a second client), wherein the message indicates at least one test case to be executed by one of the second module or the third module, and executing the at least one test case by the one of the second module or the third module with the other one of the second module or the third module, wherein the at least one test case is a real-time, low-intrusive, supply chain interoperability test.

In yet another embodiment, a computer readable medium comprises instructions for sending a command (such as, for example, an XML command) from a first module (such as, for example, a server module) to a second module (such as, for example, a client module), receiving the command at a third module (such as, for example, an application under test module) via a fourth module (such as, for example, a shared directory module) between the second module and the third module, executing a test at the third module based on the received command, and sending results of the test from the third module to the first module, wherein the test is executed and the results of the interoperability of the application between the second module and first module are sent during a real-time, low-intrusive, supply chain interoperability test.

In yet a further embodiment, a system for performing interoperability testing, the system comprises a test server adapted to generate a message, a first client adapted to receive the message, and a second client adapted to receive the message, wherein the test server, the first client, and the second client are operably coupled to each other, wherein the message indicates at least one test case to be executed by one of the first client or the second client, and the one of the first client or the second client adapted to execute the at least one test case with the other one of the first client or the second client, wherein the at least one test case is a real-time, low-intrusive, supply chain interoperability test.

In yet another embodiment, a system for performing interoperability testing, comprises a test server adapted to generate a message, and a plurality of clients adapted to receive the message, wherein the test server and the plurality of clients are operably coupled to each other, wherein the message indicates at least one test case to be executed by one of the first client or the second client, and wherein the at least one test case is a real-time, low-intrusive, supply chain interoperability test.

In yet another embodiment, an In Situ system comprises a test creator module an administrator module, and an embedded module. The test creator module is adapted to: read standards specifications, analyze the standards specifications for at least one of a following element from a list consisting of: test items, test services, optional items, optional services, required items, and required services, generate tests based on the standards specifications. The administrator module is adapted to: send the generated tests, coordinate test results, and record the test results, while the embedded module, which is imbedded in each software product used for messaging in a supply chain, is adapted to execute the generated tests and send the test results to the administrator module.

In yet another embodiment, an interoperability system comprises a first module adapted to perform at least one of a following action from a group consisting of: permutation analysis, test suit generation, and data generation, a second module adapted to: receive results of the at least one of the actions from the first module, and indicate which tests to perform based on the received results, and a third module adapted to, receive tests from the second module, execute the tests, and report results of the test to the second module.

DETAILED DESCRIPTION OF THE INVENTION

Figure 1:
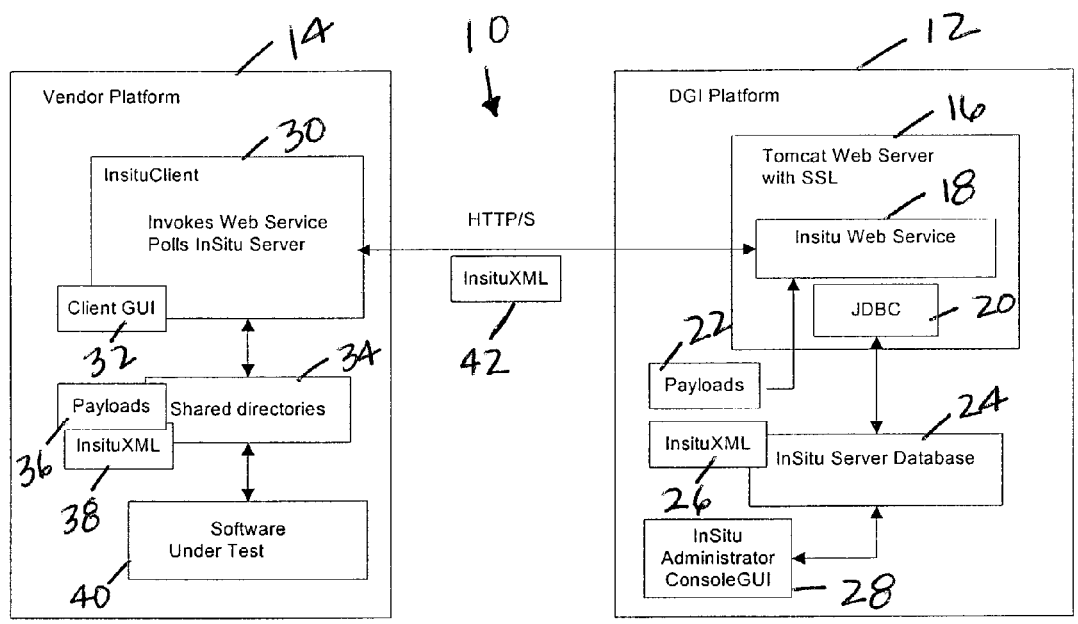
FIG. 1 illustrates a validation system in accordance with an exemplary embodiment of the present invention.

One of the biggest advantages to supply chains in utilizing interoperability tested products is choice. Supply chains would no longer have to rely on purchasing just one type of product for their entire supply chain. Rather, they would have a choice to select from various price points and vendors to satisfy their particular needs. Referring now to FIG. 1, an interoperability system 10 of the present invention is presented. The system 10 comprises a first platform 12, which is, for example, an originating platform, and a second platform 14, which is, for example, a vendor platform. The first platform 12 comprises a web server 16 which further comprises an In Situ server 18 and a database layer 20 adapted to store and access data. A payloads module 22 and an In Situ server database 24 are operably coupled to the In Situ server 18 and to the database layer 20, respectively. The In Situ server database 24 comprises an In Situ XML module 26 that reconciles messages, such as, for example, test request messages and status messages, sent between the first platform 12 and the second platform 14.

The second platform 14 comprises an In Situ client 30 comprising a graphical user interface (GUI) 32 adapted to provide the ability to view data, such as, for example, interoperability results, and to perform actions, such as, for example, the ability to initiate interoperability or conformance testing. A shared directories module 34, which is operably coupled to the In Situ client 30, comprises a payloads module 36, and an In Situ XML module 38. The In Situ XML module 38 reconciles messages, such as, for example, test request messages and status messages, sent between the first platform 12 and the second platform 14. A software or application under test module 40 is operably coupled to the shared directories module 34. The first platform 12 and the second platform 14 preferably communicate with each other via XML messages, such as, for example, In Situ XML messages, utilizing the Hypertext Transfer Protocol (HTTP) and Secure Sockets Layer (SSL).

In one embodiment, a method for performing interoperability testing comprises sending a command, which is preferably an XML command 42, from a server module 18 to a client module 30, receiving the command at an application under test module 40 via a shared directory module 34 between the client module and the application under test module, executing a test at the application under test module based on the received command, and sending results of the test from the application under test module to the server module via the shared directory module and the client module. The test is executed, and the results of the interoperability of the application between the client module and server module are sent, in a real-time, low-intrusive, supply chain setting.

The method further comprises periodically updating the client module 30 (by the server module 18 to add features such as, for example, user interface enhancements), replacing the client module with a new client module (since the distribution files comprising the client module can be overwritten with new versions), executing a test for standards compatibility at the application under test module 40 (which comprises updating the client module and describing the client module) based on a received XML command 42 related to the standards test, and sending results of the standards test from the application under test module to the server module via the shared directory module and the client module, wherein the test is executed, and the results of the interoperability of the application between the client module and server module are sent, in a real-time, low-intrusive, supply chain setting.

The method also includes adjusting the test to be executed, wherein the adjusting is performed in order to test at least one of a following item from a group consisting of: a semantic model, and a syntax model. The semantic model and the syntax model are tested for at least one of a following item from a group consisting of: headers, individual test description documents, automatic test generators, and permutational analysis engines that are preferably tested over time. Conformance testing of the application and the standards between the client module and server module is also supported.

The interoperability testing is performed In Situ on at least one of a following protocol and/or layer from a group consisting of, for example, an ISO OSI layer, an Internet Engineering Task Force (IETF) layer, an ebXML layer, a Collaborative, Planning, Forecasting, and Replenishment (CPFR) layer, Electronic Data Interchange (EDI) over the Internet Simple Mail Transfer Protocol (SMTP), EDI over the Internet HTTP, and an Open Buying over the Internet (OBI) layer. The ISO OSI layer is preferably a session layer, a presentation layer, or an application layer, while the IETF layer is preferably an application layer.

The In Situ, real-time, low-intrusive, supply chain interoperability testing is preferably performed with a plurality of vendors, and permits at least one of a following test from a group consisting of: testing and verification of a set of pre-product release software as interoperable in an automated manner, testing and verification of a set of post-product release products and versions in an automated manner, and testing and verification of products which are in production. The products which are in production are further tested and verified while actively communicating in an electronic commerce relationship, in a secure manner or in a non-secure manner, and while the products are exchanging data with other products. The products and the other products are preferably like products.

The In Situ, real-time, low-intrusive, supply chain interoperability test is defined by at least one of a following element from a group consisting of: objects, documents (which are preferably XML documents), text, and transport parameters related to the standard being tested to be configured by participants. Such transport parameters include, for AS2 testing, security settings, transmission parameters and data that is to be transmitted. The method further comprises interpreting, by individual products, the at least one element to produce a test between one or more products.

Important features include the ability for the test cases to be defined in any manner which individual products may interpret to produce a test between one or more products, and a functionally defined product interface, independent of implementing technology, which interprets the test cases and produces a test among one or more products In Situ in the actual B2B environment. This means that products installed and being used in actual supply chains may be tested, in a non-intrusive functional manner, to production communications.

The Transmission Control Protocol/Internet Protocol (TCP/IP) governs the transport and routing of data over the Internet. Other protocols, such as HTTP, Lightweight Directory Access Protocol (LDAP), and Internet Messaging Access Protocol (IMAP), utilize TCP/IP to support typical application tasks such as displaying web pages, running email servers, and exchanging business-to-business documents and messages. The present invention implements a module, that is distributed with, or added later to, a product utilizing HTTP, LDAP, IMAP, ebXML, and any other application layer software, to conduct interoperability testing. Such testing can occur after installation in the supply chain environment, In Situ, in a manner which does not inhibit the use of the software in its function of product exchanges of B2B transactions, data base accesses, registry interactions, or other primary or auxiliary support of B2B functions.

The SSL protocol runs above TCP/IP and below higher-level protocols such as HTTP or IMAP. The SSL protocol further uses TCP/IP on behalf of the higher-level protocols, and in the process allows an SSL enabled server to authenticate itself to an SSL enabled client, allows the client to authenticate itself to the server, and allows both the client and the server to establish an encrypted connection.

In general, the system and method of the present invention utilizes individual tests that will be generated and conveyed in digital information format (test documents). A software module will be produced which interprets these test documents and generates a test that does not interfere with the B2B exchange of information. The software module will be contained in or accessed by all products involved in the test, and as one product generates tests through the module, receiving products incorporating the module will, as instructed, conduct their function in the test. Such test generation and test functionality is performed during active B2B communications in a live supply chain or distribution channel without human intervention. Results are sent to a central server that will correlate the results and issue instructions to the products to conduct the next in the series of tests. Results from the tests, located on the central server, will be distributed to participating organizations with success and failure information. Such lifecycle interoperability validation testing can be performed among hundreds of products with multiple version from a plurality of vendors.

In another embodiment of the present invention, an In Situ system comprises a plurality of modules to facilitate automated interoperability testing including an In Situ test creator or generator module in communication with an In Situ administrator module which is in communication with an In Situ embedded module. In an alternate embodiment, the modules may be in communication with each other. The test creator module is adapted to read standards specifications, and analyze the standards specifications for at least one of a following element from a list consisting of: test items, test services, optional items, optional services, required items, and required services, and generate tests based on the standards specifications. After the standard has been evaluated by standards extracting software, the output will be fed into a permutational analysis engine which has two main purposes. First, to determine the best combination of variables and services. These combinations directly indicate the number and purpose of single test instances. Second, to generate tests in a manner that reduces the overall number of tests that must performed to demonstrate interoperability and conformance.

The administrator module is the administration facility in the supply chain. It creates effective tests instances, and coordinates and records tests results. Further, the administrator module contains XML documents which describe the test suite, the participants, their IP or URL address, and the individual test instances. The documentation is then distributed from the server 18 to the vendors' client's 30 by allowing them to retrieve the information at their discretion. This test information, once conveyed to all vendors (or participants), includes the necessary data required to perform fully automated interoperability testing. Various documents, such as, for example, Master Test Suite and Individual Test documents, can be read for the information provided by a previously installed API in each individual product. An additional API is installed which writes out, in a predetermined XML document, the status and information of individual test completion results of all participants. This information is gathered periodically in the InSitu Administrator 28 for status and audit trail purposes.

The embedded module (which is preferably an application programming interface (API) and comprises a plurality of modules), is imbedded in each software product used for messaging in a supply chain, and is adapted to read test documents (which are preferably XML test documents). The embedded module communicates test results to the administrator module (which records the results). The test results are stored in a database which the administrator module reads and writes to. Reflections of these API are used in the administrator module to create the XML test documents and read the XML test record documents. Information retrieved from the XML test documents through the API is used to set up and individually test exchanges between each indicated trading vendor or partner. Testing specific extensions to standards should be created which support test identification in the protocol envelope itself.

In a further embodiment of the present invention an interoperability system comprises a first module, a second module (which is preferably a real-time, supply chain, In Situ, interoperability validation system), and a third module (which is preferably a vendor specific product but may be a vendor neutral product). The first module is adapted to perform at least one of a following action from a group consisting of permutation analysis, test suit generation, and data generation. The second module is adapted to receive results of the at least one of the actions from the first module, and indicate which tests to perform based on the received results, while the third module is adapted to receive tests from the second module, execute the tests, and report results of the test to the second module. The interoperability system may further comprise a plurality of third modules adapted to receive tests from the second module, execute the tests, and report results of the test to the second module. At least one protocol may be tested between the plurality of third modules.

The generated test descriptions are nearly universal from a semantics and a syntax perspective, the permutational analysis allows the automated test generator to create as few individual product interoperability tests as possible, and the protocols and application headers are in a nearly universal usable form. Semi-automated and fully automated test generation from standards documents are provided. The individual test and the overall test will be described in a database of XML test instance documents. The software program of the present invention reads a standards document locating the key section headers (such as, for example, the keywords MUST, SHOULD, MAY, etc.), and output a skeleton for the individual test descriptions. The output is structured as the outline of the document and within each section will show the "or" and "and" with the MUST and MAY in a manner that will reduce human error in test creation by overlooking services, protocol options and other pertinent elements of the test. Further described, a "standard" is written with the MUST, SHOULD, and MAY keywords. The software program will analyze the document for these keywords and extract the sentences that contain these keywords. These sentences then become the test cases. The software program generates as many test cases as needed to guarantee full coverage of testing looking at certain keywords, such as, "or" and "as" in doing so.

Individual test description documents may be described in either objects or XML documents, and headers in a protocol specific manner can use general semantics and syntax. The supply chains should have the ability to validate that a software product used in the supply chain and that its subsequent version changes remain interoperable through its life cycle in the In Situ production environment used for B2B electronic commerce. Utilizing an In Situ production environment is key because both testing interoperability validation for transfer layers of the supply chain (for example, EDI over Internet and ebXML messaging services), and testing all the layers which will support the supply chain (for example, HTTP web services, style sheets, and business process routing layers) should be supported since components that work well together at one layer may not when combined in different layer configurations (i.e., the interoperability capability is frequently lost).

Figure 2:
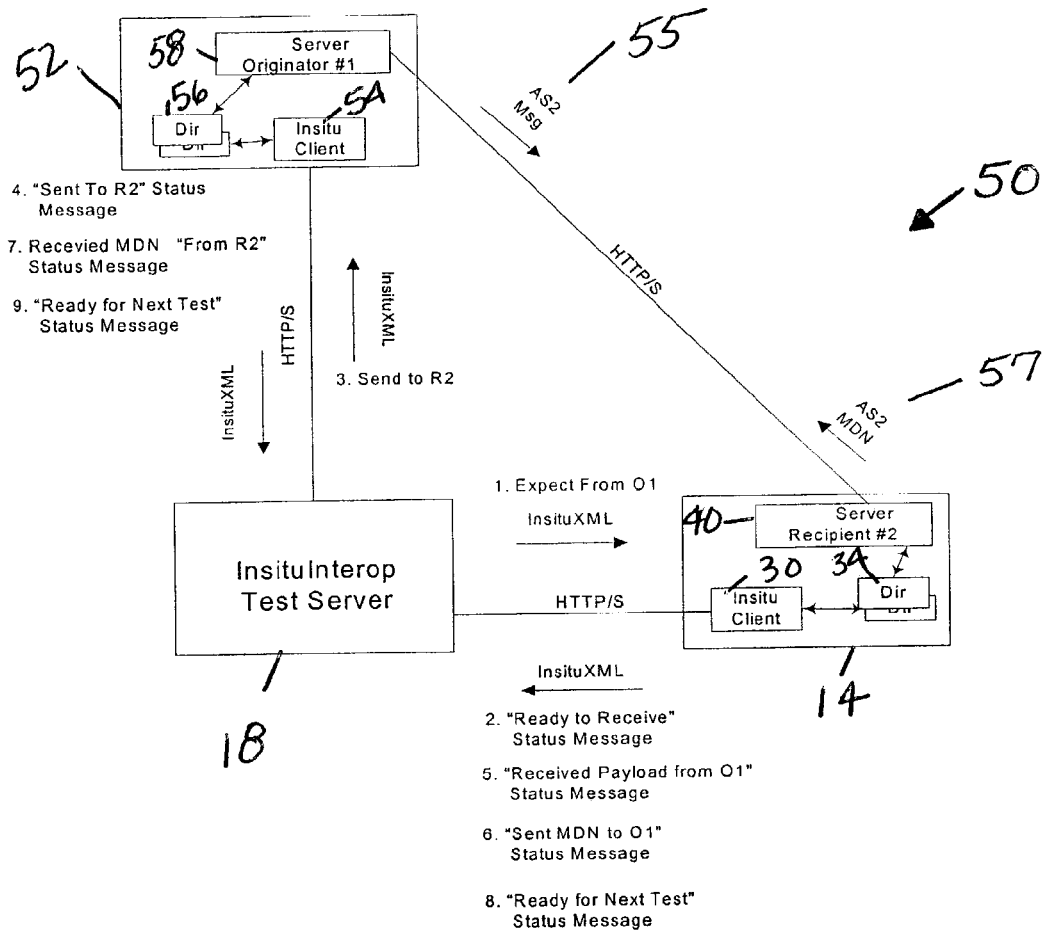
FIG. 2 illustrates a message flow of a validation system in accordance with an exemplary embodiment of the present invention.

Referring now to FIG. 2, a system 50 for performing interoperability testing between a server 18, a first vendor 14, and a second vendor 52, is depicted. Similar to FIG. 1, the server 18 is operably coupled to a first vendor platform 14, and more specifically, to an application or software under test module 40 (which is preferably an AS2 server) via a shared directories module 34 and a first client 30. The vendor 14 and the server 18 are operably coupled to a second vendor platform 52 via an application or software under test module 58 (which is preferably an AS2 server) and via a second client 54, respectively. The application or software under test module 58 and the second client 54 are operably coupled to one another via a shared directories module 56.

The test server 18 will generate test messages (which are preferably In Situ XML messages) and send them to the clients 30 and 54 participating in interoperability testing via HTTP. The clients 30 and 54 are responsible for extracting the HTTP payloads and writing them out to a directory dedicated for incoming test requests. The clients 30 and 54 will also be responsible for monitoring a dedicated status directory (not shown) that contains status messages (which are preferably In Situ XML messages) written there by the application or software under test modules 40 and 58. After processing the status messages, the clients 30 and 54 can move the processed status messages to an archive directory (not shown). The clients 30 and 54 read a configuration file on startup that contains server's 18 IP address, port to listen on, status and test request directory locations, and archive directory locations.

The application or software under test modules 40 and 58 will monitor this dedicated shared directory 34, processes the test messages as they arrive, and move the test messages to an archive directory on successful processing. The test messages are moved to an archive directory so they do not get processed more than once. The application or software under test modules 40 and 58 communicate status via ongoing processing of the incoming test request messages. Status is communicated by generating a status message and writing it out to a dedicated directory for status reporting. The server 18 will first generate a test expectation message to each vendor that will inform the recipient 40, for example, of which test case will be executed by the originator 58, for example, that will be identified in the content of the message. The server 18 will then wait for a "Ready To Receive" test status message (from each recipient) that indicates to the server that the recipient 40 is waiting to receive a message (preferably an AS2 message) from the originator 58 indicated in the test expectation message. Once server 18 receives a "Ready To Receive" message, it will then issue a test request message to the originator 58. The final status received by the server 18 will be used to trigger subsequent test cases to be executed.

In one embodiment of the present invention, method for performing interoperability testing comprises generating a test expectation message by the server 18, sending the test expectation message to the first client 30, sending the test expectation message to the second client 54, wherein the test expectation message indicates at least one test case to be executed by one of the first client or the second client. The method proceeds by receiving a ready to receive message by the server 18 from one of the first client 30 or the second client 54, wherein the ready to receive message indicates to the server which one of a first server 40, operably coupled to the first client, or a second server 58, operably coupled to the second client, is ready to receive a message (which is preferably an AS2 message) from the other one of the first server or second server. The method further comprises executing the at least one test case by the one of the first client 30 or the second client 54, wherein the at least one test case is a real-time, low-intrusive, supply chain, interoperability test. The method also comprises monitoring the execution of the at least one test case by the one of the first client 30 or the second client 54, and sending the test expectation message to a plurality of clients.

Referring again to FIG. 2, two test participants, Recipient #2 40 and Originator #1 58 are depicted. There could be more than two test participants in an interoperability test round. The flow of messages between the participants 40 and 58 and the the In Situ Test Server 18 is as follows:

1. Expect from O1 (Originator #1)—The Test Server first alerts Recipient #1 that a Test Case will be executed and identifies the Originator of a test message, in this case Originator #1;
2. "Ready to Receive" Status Message—Recipient #1 indicates it is ready to receive the message. An InSitu XML formatted status message is sent to the InSitu Server;
3. Send to R2 (Recipient #2)—The InSitu Server then sends a command to Recipient #2, instructing it to execute the test case that comes with the "send" command;
4. Sent to R2 (Recipient #2) Status Message—Recipient #2 then sends an InSituXML formatted message to the InSitu Server indicating it has performed the "send" command;
5. Received Payload from O1 (Originator #1)—The Recipient sends an InSituXML status message to the InSitu Server that it has received the payload which is part of the AS2 message. The InSitu Server can determine that the test executed successfully. Alternatively, the Recipient can also indicate that it has not received a message from the Originator after waiting for a certain amount of time;
6. Sent MDN to O1 (Originator #1)—The Recipient informs the InSitu Server that it has successfully sent an MDN to the Originator; and
7. Received MDN From R2 (Recipient #2)—The Originator sends status to the InSitu Server that it has received the MDN successfully.

Although AS2 messages are depicted in FIG. 2, such as AS2 message 55 they are used as an example only. Other B2B standards are supported by the present invention. An AS2 message, which agrees with the AS2 standard, is in response from an InSitu Server send command. The AS2 Message Disposition Notification (MDN) message 57 is also specific to the AS2 standard and notifies the Originator (sender) of the message that the recipient has received the message. An MDN is a signed receipt of data delivery, and is used for non-repudiation of a receipt.

Figure 3:
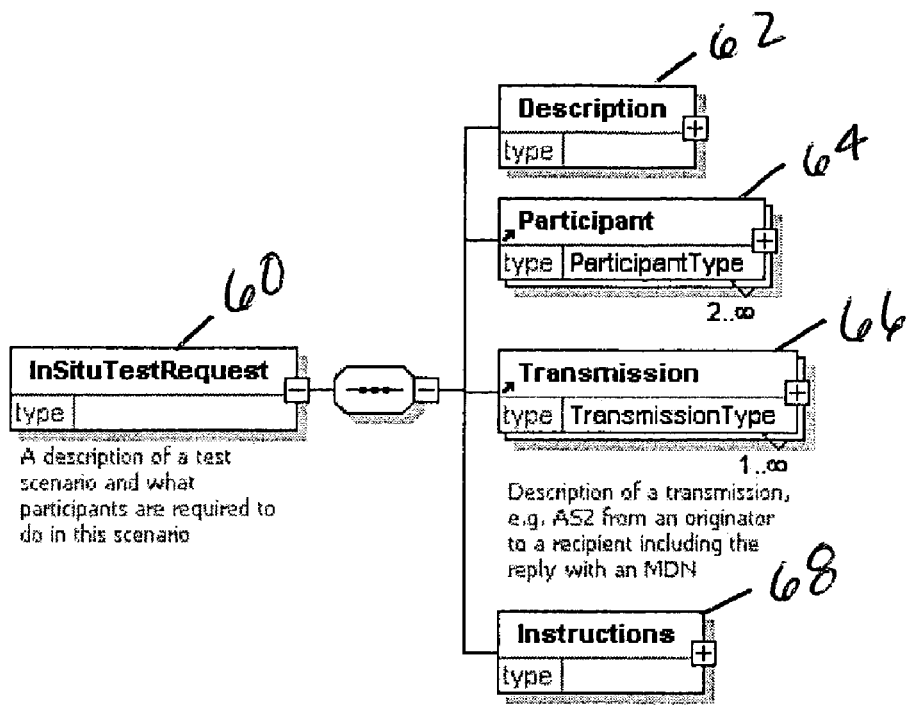
FIG. 3 illustrates an InSituTestRequest element in accordance with an exemplary embodiment of the present invention.
Figure 4:
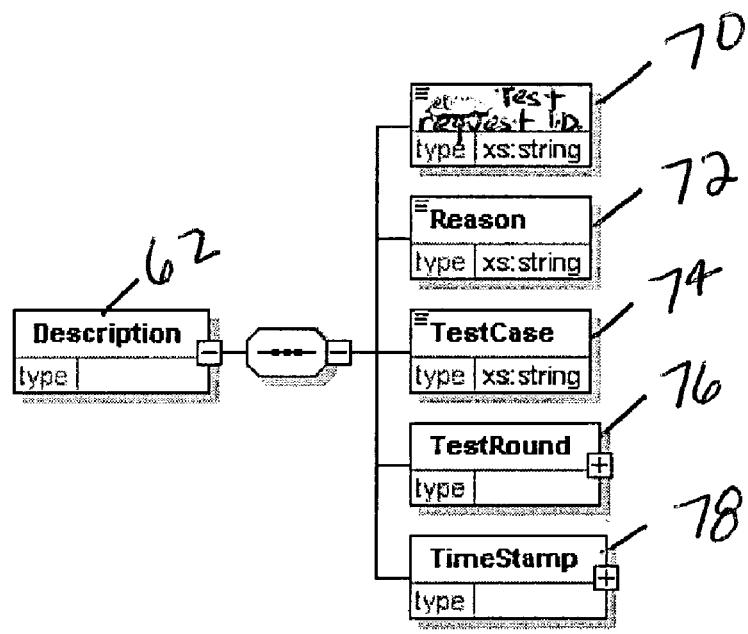
FIG. 4 illustrates a Description element in accordance with an exemplary embodiment of the present invention.

Various InSituXML messages are produced and/or consumed by the servers 18, 40, and 58. Referring now to FIG. 3, the InSituTestRequest element 60 consists of a Description 62, the Participant(s) involved 64, Transmission information 66, and Instructions 68. FIG. 4 depicts the Description element 62 which encapsulates information regarding the test case the server 18 has scheduled for execution. The Description element 62 includes a test request identifier element 70 that is used to uniquely identify the test request. It is generated by the InSituServer and is used by the software under test to communicate back to the InSituServer. The software under test module 40 can maintain this identifier and provide it back in response messages to the server 18. The Reason element 72 indicates whether the InSituTestRequest is intended for executing a Test Case 74, in which case the value of the type attribute will be "TestRequest", or used for reporting status, in which case the type attribute will be "StatusUpdate." The TestCase element 74 identifies the test to be executed by the software under test module 40 which may have the test configuration pre-coded based on, for example, documented Test Cases.

Figure 5:
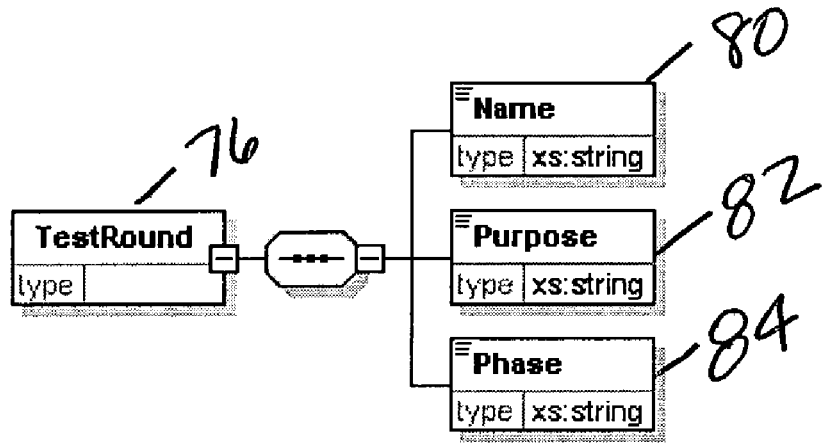
FIG. 5 illustrates a TestRound element in accordance with an exemplary embodiment of the present invention.
Figure 6:
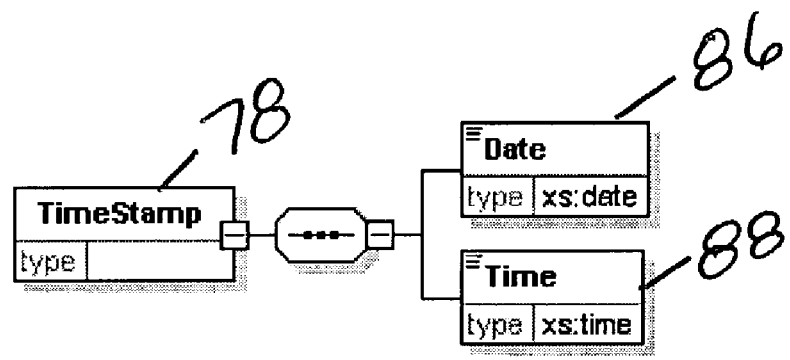
FIG. 6 illustrates a TimeStamp element in accordance with an exemplary embodiment of the present invention.

Referring now to FIG. 5, the TestRound element 76 further documents the Test Case 74 instance and is provided by the InSituServer. It is used to give the Name of the Test Round, the Purpose and Phase of the test execution. The TimeStamp element 78, as depicted in FIG. 6, is used to provide the Date 86 and Time 88 of when the test request instance was generated by the server 18.

Figure 7:
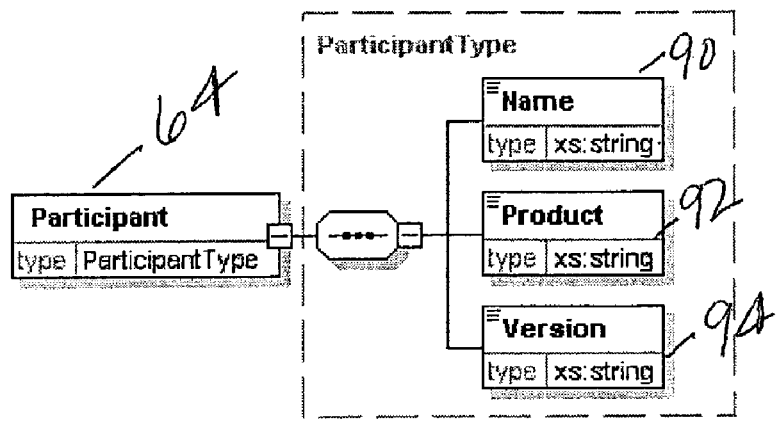
FIG. 7 illustrates a Participant element in accordance with an exemplary embodiment of the present invention.
Figure 8:
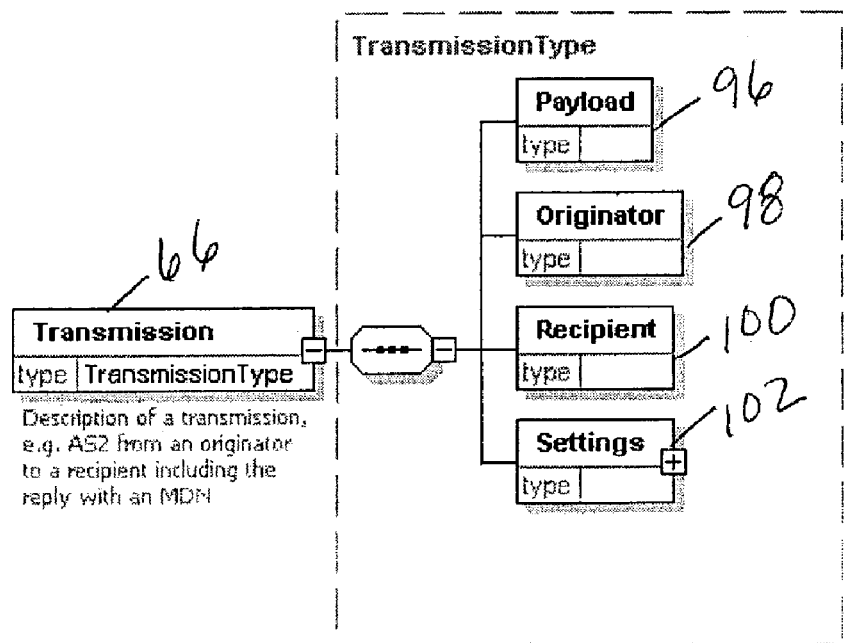
FIG. 8 illustrates a Transmission element in accordance with an exemplary embodiment of the present invention.

Referring now to FIG. 7, the Participant element 64 comprises a company Name 90, as well as Product 92 and Version 94 elements that are used for tracking and reporting purposes. The identification attribute of the Participant element 64 can be used by the originator to look up configuration information for the target participants (recipients) of the test. It is important to note that at least two participants will be specified in an InSituTestRequest message. The Transmission element 66, as shown in FIG. 8, is used for defining the Test Case 74 configuration transmission parameters which include a Payload element 96, the Originator element 98, the Recipient element 100, and a Settings element 102. The Payload element 96 provides the Filename and Type of data used for the Test Case. The Originator element 98 and the Recipient element 100 specify the sender and receiver, respectively, of the Test Case.

Figure 9:
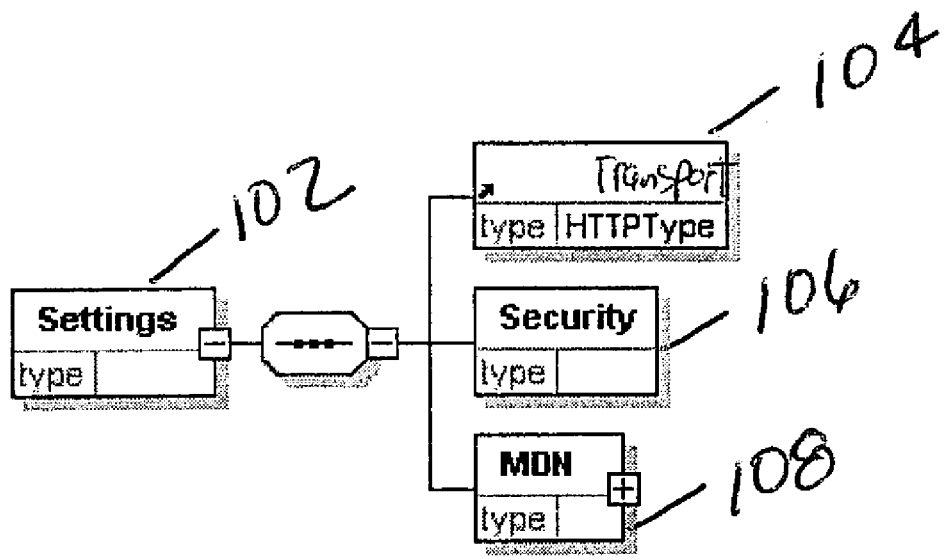
FIG. 9 illustrates a Settings element in accordance with an exemplary embodiment of the present invention.
Figure 10:
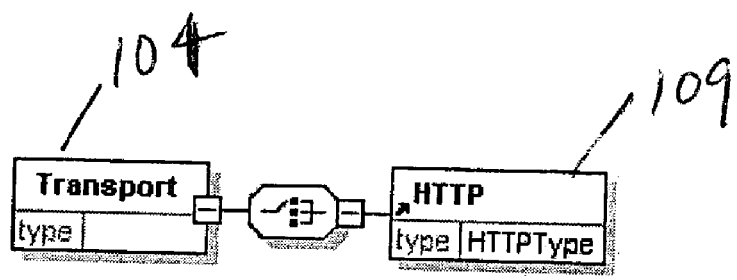
FIG. 10 illustrates a MDN element in accordance with an exemplary embodiment of the present invention.

Referring now to FIG. 9, the Settings element 102 contains the configuration for the Message and MDN transport and security settings used for the Test Case 74 referenced in Description. The Transport element 104 indicates whether HTTP or SMTP should be used. AS2 would contain an HTTP child element, whereas the AS1 Transport would contain an SMTP child element. The Payload Security element 106 specifies the security configuration for the payload. The Signed attribute indicate whether the payload should be signed or not. The Encrypted attribute indicates whether the payload should be encrypted or not. If both attribute are set to true, the payload should be signed and encrypted. The Transport element 104 in FIG. 10, contains an HTTP element 109 that includes three attributes: TLS, Compression and URL. The HTTP element indicates the transmission should occur over HTTP. The TLS attribute indicates whether SSL should be used. The Compression attribute indicates if compression should be used or not. Possible values are true or false. The URL attribute is the target of the transmission over HTTP.

Figure 11:
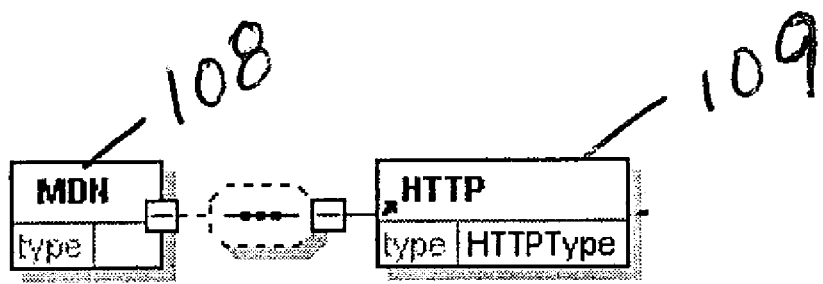
FIG. 11 illustrates a DataReferences element in accordance with an exemplary embodiment of the present invention.
Figure 12:
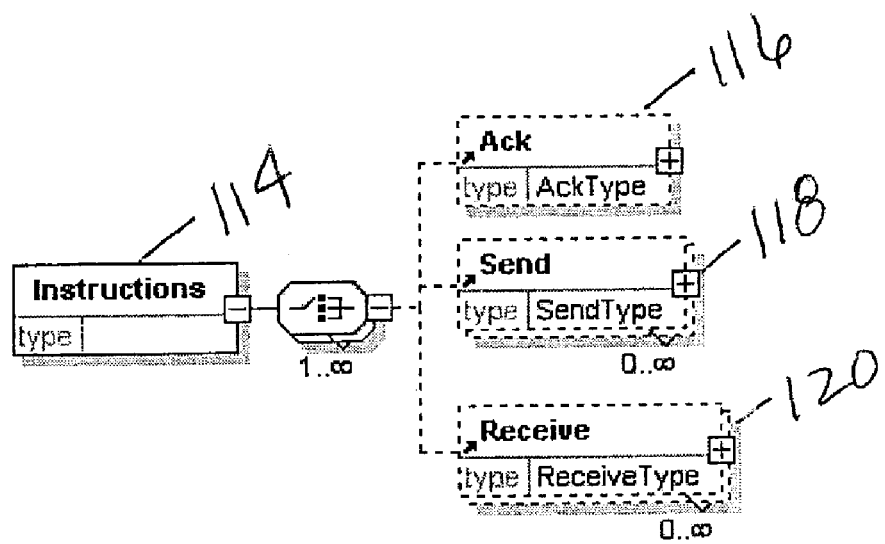
FIG. 12 illustrates an Instructions element in accordance with an exemplary embodiment of the present invention.
Figure 13:
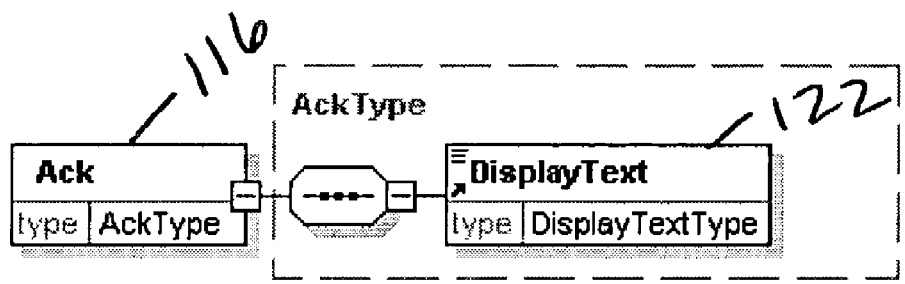
FIG. 13 illustrates an Ack element in accordance with an exemplary embodiment of the present invention.
Figure 14:
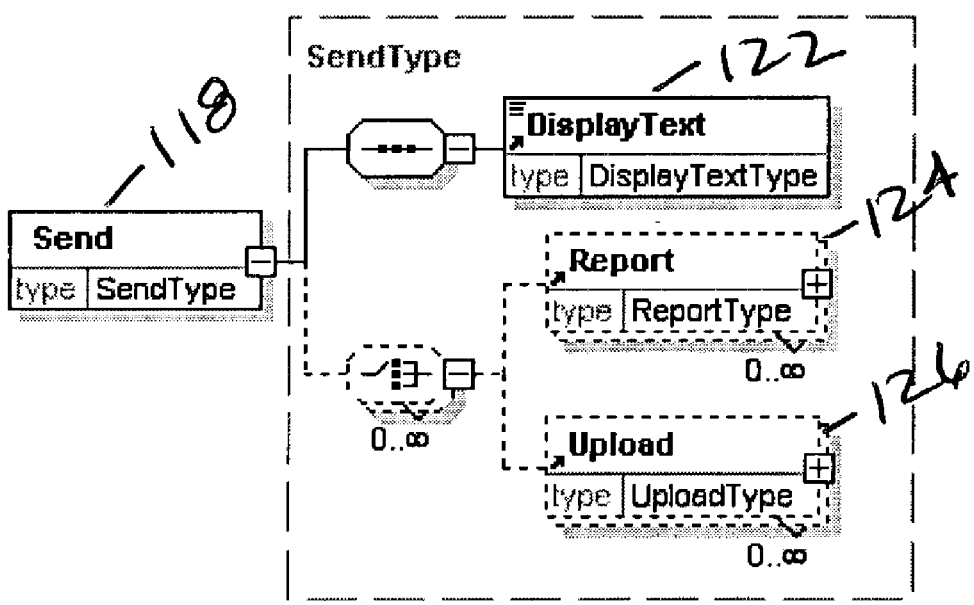
FIG. 14 illustrates a Send element in accordance with an exemplary embodiment of the present invention.

Referring now to FIG. 11, a MDN element 108 contains information regarding the transport of the MDN from the Receiver and comprises the HTTP element 109. The MDN element 108 conveys if and how the recipient of the message should reply with an MDN. If an HTTP child element is contained with the MDN element, the MDN should be returned over HTTP. The HTTP child element has the same attributes as described for the Transport HTTP child element as they are of the same type (HTTP Type). The MDN attributes indicate whether the MDN should be returned synchronously or asynchronously. In addition the Signed attribute indicates whether the MDN should be signed or not Referring now to FIG. 12, an Instructions element 114 is used for communicating commands which the software under test modules 40 and 58 should act on accordingly. The Ack message 116 is generated by the software under test module 40 and 58 to indicate receipt of a test request. The DisplayText 122 associated with the Ack instruction 116, as shown in FIG. 13, is displayed on the client 30 and 54. The Send instruction 118, as shown in FIG. 14, is sent to the Recipient of the Test Case in question. The send instruction 118 includes the Display text 122 as well as a Report element 124 and an Upload element 126 which contain optional display text for the client 30 and 54. In response to receiving an Ack Instruction, the modules 40 and 58 should create a status file with the name specified by the ResponseID attribute plus "#P" for a positive acknowledgment, or "#N" for a negative acknowledgment and a .msg extension. This file should be deposited in the StatusDirectory. If the Acknowledgment is positive, the contents of the file will be ignored; if the acknowledgment is negative, the file may contain text providing a reason. This text is preferably human readable text that will be displayed in status displays.

Figure 15:
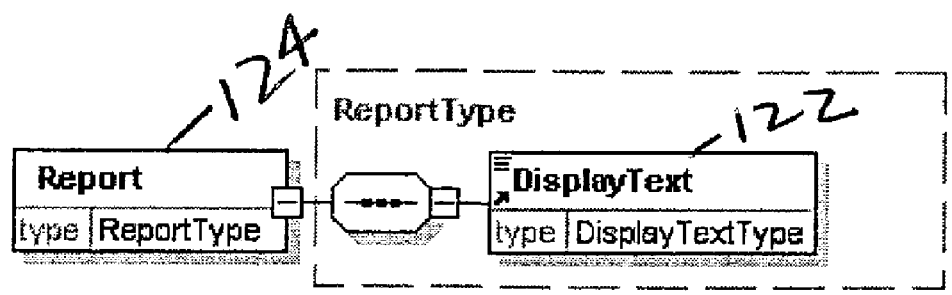
FIG. 15 illustrates a Report element in accordance with an exemplary embodiment of the present invention.
Figure 16:
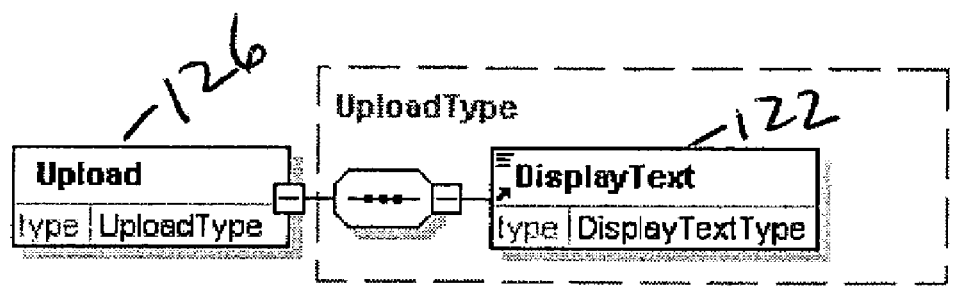
FIG. 16 illustrates an Upload element in accordance with an exemplary embodiment of the present invention.
Figure 17:
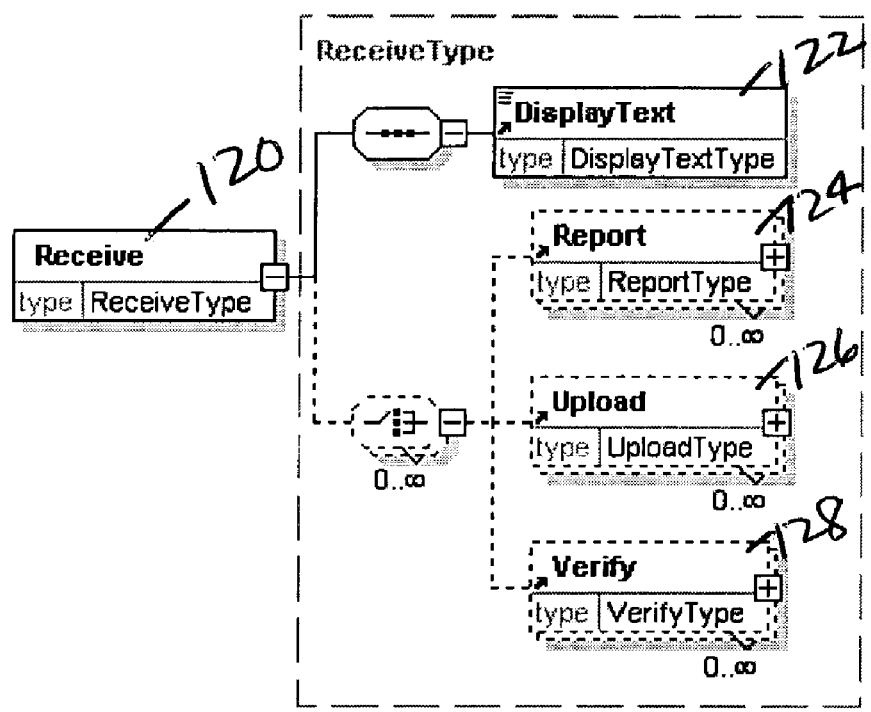
FIG. 17 illustrates a Receive element in accordance with an exemplary embodiment of the present invention.
Figure 18:
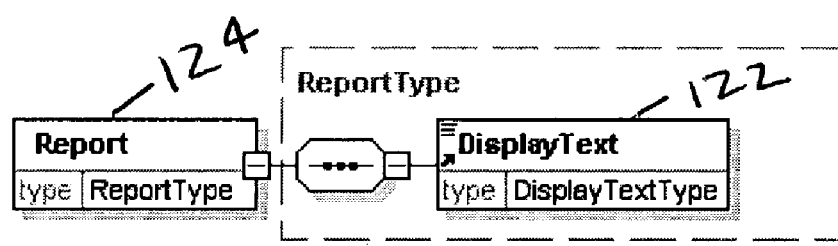
FIG. 18 illustrates a Report element in accordance with an exemplary embodiment of the present invention.
Figure 19:
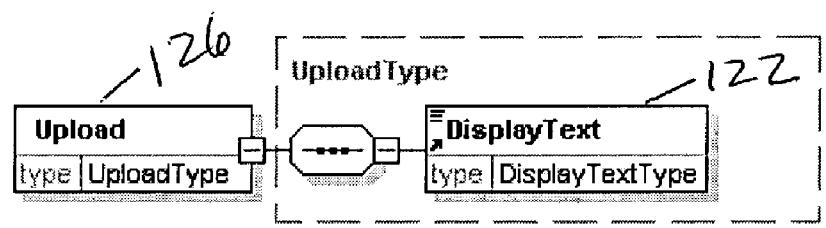
FIG. 19 illustrates an Upload element in accordance with an exemplary embodiment of the present invention.
Figure 20:
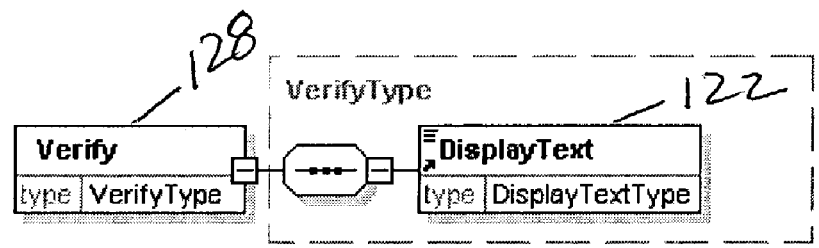
FIG. 20 illustrates a Verify element in accordance with an exemplary embodiment of the present invention.

Referring now to FIGS. 15 and 16, the Report element 124 and the Upload element 126, each include the DisplayText 122. A Receive instruction 120 is depicted in FIG. 17. Before the Originator 98 of a Test Case 74 receives a Send command 118, the Recipient 100 is first notified to expect an incoming message (which is preferably an AS2 message) as defined by the InSituTestRequest element 60. The DisplayText 122 associated with the Receive instruction 120 is displayed on the client 30 and 54. The Receive instruction 120, further comprises the Report element 124, the Upload element 126, and a Verify element 128 which is a checkpoint to qualify the containing element (i.e. send or receive). There are multiple types of verification such as encryption and signature. Referring now to FIGS. 18-20, the Report element 124, the Upload element 126, and the Verify element 128 are respectively depicted comprising the DisplayText 122.

Described further, during a software under test response to a Send Instruction, the software under test should send a file to the other Test Participant. The information on what to send and the transmission settings can be found in the Transmission Element described above. The software under test should check the child elements to see what other instructions are required with respect to feedback and status update to the server. These child elements include Report element 124 and the Upload element 126. The Receive instruction 120 is not as much an active act, but can be used to prepare the system, and functions as a container for other instructions that are directly related to receiving the transmission. These other instructions are Report, Upload, and Verify.

In response to the Receive instruction 120, the software under test should check the child elements (e.g. Report, Upload and Verify) to determine what actions should be undertaken with respect to the system. The Report element 124 is an instruction typically found in the context of another instruction. For example, it can be a child element of a Send or Receive element. It is used to report back on the status or progress of the instruction that contains it and thus acts like a "checkpoint." The Report instruction should be executed as soon as the containing instruction (e.g. Send or Receive) has been executed or triggered. As soon as the containing instruction is executed or triggered, the Report instruction should be executed (as soon as the transmission is received, the software under test should report on this). Reporting is done by writing a status file into the StatusDirectory. This file should be named with the ResponseID attribute found in the element and the .msg extension. The contents of the file may be empty, or may contain a human readable error or status text. This text will be used for display purposes only.

The Upload element 126 is used to request a copy of the file sent or received. This file is to be deposited in the StatusDirectory. The In Situ Client may then verify the file, or upload it to the In Situ Server. As soon as the containing instruction (e.g. Send or Receive) is executed or triggered, the contained Upload instruction should be executed. For instance, in the example above, as soon as the transmission is received, the software under test should copy the file as it was received. Determining which file should be uploaded can be derived from the containing instruction element, plus the Format attribute. The Format attribute indicates if the file is the raw data as sent over the wire, or is the payload. The filename to use when writing the file into the StatusDirectory, is indicated by the ResponseID attribute. A .bin extension is preferably used.

The Verify element 128 Verify is a checkpoint to qualify the containing element, i.e. Send or Receive. The Encryption verification type mandates that the recipient of the transmission checks whether the data was encrypted with the proper encryption algorithm and public key, and that the recipient could successfully decrypt the payload. The Decryption verification type mandates that the recipient of the transmission checks that he could verify successfully that the message was sent by the originator, taking into account hashing algorithm and certificates. As soon as the containing instruction is executed or triggered, the contained Verify checkpoint should be evaluated. After evaluation, the result should be written out to a file in the StatusDirectory.

The various elements in FIGS. 1 and 2, such as the first platform 12, the second platform 14, the web server 16, the In Situ server 18, the database layer 20, the payloads module 22, the In Situ server database 24, the In Situ XML module 26, the In Situ client 30, the GUI 32, the shared directories module 34, the payloads module 36, the In Situ XML module 38, the software or application under test module 40, the third platform 52, the client 54, the shared directories module 56, and the software or application under test module 58 may include instructions to be performed by a computer readable medium. The computer readable medium may be a processor (not shown), and the instructions may be stored in a memory (not shown).

In one embodiment of the present invention, the instructions performed by the computer readable medium include generating a message by a first module (such as, for example, a server), sending the message to a second module (such as, for example, a first client), sending the message to a third module (such as, for example, a second client), wherein the message indicates at least one test case to be executed by one of the second module or the third module, and executing the at least one test case by the one of the second module or the third module with the other one of the second module or the third module, wherein the at least one test case is a real-time, low-intrusive, supply chain interoperability test.

In another embodiment of the present invention, the instructions performed by the computer readable medium include sending a command (such as, for example, an XML command) from a first module (such as, for example, a server module) to a second module (such as, for example, a client module), receiving the command at a third module (such as, for example, an application under test module) via a fourth module (such as, for example, a shared directory module) between the second module and the third module, executing a test at the third module based on the received command, and sending results of the test from the third module to the first module, wherein the test is executed and the results of the interoperability of the application between the second module and first module are sent during a real-time, low-intrusive, supply chain interoperability test.

Although an exemplary embodiment of the present invention has been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims.

What is claimed is:

1. A method for coordinating interoperability testing of software standards among a plurality of applications under test, some said applications under test acting as senders, other said applications under test acting as receivers, under the control of an administrative server, the method comprising:

sending a command from the administrative server to an administrative client, whereby the administrative client makes available the command to the "receiver" application under test via a shared directory;

the command instructing the application under test to take on the role of receiver and informing it of the test the "sender" application under test will perform, the "reciever" application under test, then acknowledging the command by providing status back via the shared directory, and the application under test configuring itself according to the command just received, and waiting on the sender application under test, the sender application under test, then being instructed to take on the role of the sender, and to commence testing, in similar fashion, by the sending a command to the "sender" application under test, from the administrative server to the administrative client via the shared directory;

the sender application under test, acknowledging the command and commencing testing execution against the receiver application under test, as identified in the command, the test, comprising testing for interoperability success in a live supply chain, or controlled testing environment, of software standards a module including the application under test based on the received commands;

sending results of the test from the application under test module to an administrative server module via the shared directory and an administrative client module; and wherein the test is coordinated in a real-time, low-intrusive, supply chain setting, or controlled testing environment.

2. The method of claim 1 further comprising periodically updating the administrative client module.

3. The method of claim 1 further comprising replacing the administrative client module with a new administrative client module.

4. The method of claim 1 wherein the test for standards interoperability at the application under test module is based on a received XML command related to the standards test.

5. The method of claim 4 further comprising sending results of the standards test from the application under test module to the administrative server module via the shared directory module and the administrative client module.

6. The method of claim 5 further, wherein the test is coordinated, and the results of the interoperability of the application under test are sent between the administrative client module and the administrative server module in a real-time, low-intrusive, supply chain setting.

7. The method of claim 4 further comprising performing conformance testing of the standards between the administrative client module and the administrative server module.

8. The method of claim 1 further comprising adjusting the test to be executed.

9. The method of claim 8, wherein the adjusting is performed in order to test at least one of a following item from a group consisting of:
a semantic model; and
a syntax model.

10. The method of claim 9, wherein the semantic model and the syntax model are tested for at least one of a following item from a group consisting of:
headers;
individual test description documents;
automatic test generators; and
permutational analysis engines.

11. The method of claim 10, wherein the permutational analysis engines are tested over time.

12. The method of claim 1 further comprising performing conformance testing of the application under test.

13. The method of claim 1, wherein the interoperability testing is performed In Situ.

14. The method of claim 1, wherein the interoperability testing is performed on at least one of a following layer from a group consisting of:
an International Standard Organization (ISO) Open System Interconnect (OSI) layer;
an Internet Engineering Task Force (IETF) layer;
an Electronic Business using eXtensible Markup Language (ebXML) layer;
a Collaborative, Planning, Forecasting, and Replenishment (CPFR) layer;
an Electronic Data Interchange (EDI) over the Internet Simple Mail Transfer Protocol (SMTP);
an EDI over the Internet HTTP;
an EDI over the Internet FTP; and
an Open Buying over the Internet (OBI) layer.

15. The method of claim 14, wherein the ISO OSI layer is preferably a session layer.

16. The method of claim 14, wherein the ISO OSI layer is preferably a presentation layer.

17. The method of claim 14, wherein the ISO OSI layer is preferably an application layer.

18. The method of claim 14, wherein the IETF layer is preferably an application layer.

19. The method of claim 1, wherein the interoperability testing permits at least one of a following test from a group consisting of:
testing and verification of a set of pre-product release software as interoperable in an automated manner;
testing and verification of a set of post-product release products and versions in an automated manner; and
testing and verification of products which are in production.

20. The method of claim 19, wherein the products which are in production are further tested and verified while actively communicating in an electronic commerce relationship.

21. The method of claim 19, wherein the products which are in production are further tested and verified in a secure manner.

22. The method of claim 19, wherein the products which are in production are further tested and verified in a non-secure manner.

23. The method of claim 19, wherein the products which are in production are further tested and verified while the products are exchanging data with other products.

24. The method of claim 23, wherein the products and the other products are preferably like products.

25. The method of claim 1, wherein the test is defined by at least one of a following element from a group consisting of:
objects;
documents;
text; and
transport parameters.

26. The method of claim 25, wherein the document is preferably an XML document.

27. The method of claim 25 further comprising interpreting, by individual products, the at least one element to produce a test between one or more products.

28. A method for coordinating interoperability testing against any B2B standard and among any number of B2B applications either in a controlled environment or in a real-time, low-intrusive, supply chain interoperability test, the method comprising:
an Interoperability Test Server coupling two B2B applications from a total number of B2B applications involved in interoperability testing, based on administration and test configuration stored in the Interoperability Test Server via a GUI operated by a test administrator, which generally entails $((n*(n-1))*2*$ number of test cases, or full matrix testing, if so desired, as configured and determined by the test administrator, where n represents the total number of B2B applications participating in a test, and 2 implies that each test case is executed twice by each B2B application, both as sender and receiver;
generating a first test request message by the Interoperability Test Server, based on the test matrix configuration and availability of the B2B applications, the Interoperability test server sending the first test request message to a B2B application under test which has been intelligently determined to be available for testing by the Interoperability Test Server;
the Interoperability test server informing the B2B application under test that it should configure itself to receive the first test message;
the Interoperability test server waiting for an acknowledgement response from the application under test;
the Interoperability test server sending a second test request message to a second B2B application under test, only upon receiving the acknowledgement from the first B2B application under test that is ready to receive,
where the second B2B application under test is intelligently determined by the Interoperability Test Server to be available for testing and the Interoperability test server required to test against the first B2B application under test, and informing the second B2B application under test to "send" a test message to the first B2B application under test which is waiting for an expected test case as indicated in the test request;

wherein the test request message indicates at least one test case having expected parameters to be executed by the sending B2B application under test and with instructions for reporting back to the Interoperability Test Server by both the sending and receiving B2B applications under test, that the test message was or was not received, and followed the expected parameters outlined in the test case;

and wherein the Interoperability Test Server, deeming the given test case completed, based on reporting and evaluation by both B2B applications under test, then, and only then, marking both B2B applications under test available for further testing, based on the capacity of each as configured in the Interoperability Test Server, either as senders or receivers of test messages, and intelligently coordinating further test request message deliver via a smart Interoperability Test Client, installed along side each B2B application under test, until the full test configuration has been executed and completed.

* * * * *

UNITED STATES PATENT AND TRADEMARK OFFICE
CERTIFICATE OF CORRECTION

PATENT NO.        : 7,237,014 B2                                    Page 1 of 1
APPLICATION NO.  : 10/386609
DATED              : June 26, 2007
INVENTOR(S)        : Richard VaNeile Drummond, II It is certified that error appears in the above-identified patent and that said Letters Patent is hereby corrected as shown below:

Column 14, line 32, "reciever" should read -- receiver --

Signed and Sealed this

Thirteenth Day of November, 2007

JON W. DUDAS
*Director of the United States Patent and Trademark Office*